US006598943B2

(12) United States Patent
Harris

(10) Patent No.: US 6,598,943 B2
(45) Date of Patent: Jul. 29, 2003

(54) BACK-UP BRAKING IN VEHICLE BRAKING SYSTEMS

(75) Inventor: Alan Leslie Harris, Coventry (GB)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 10/004,524

(22) Filed: Nov. 1, 2001

(65) Prior Publication Data
US 2002/0113488 A1 Aug. 22, 2002

Related U.S. Application Data

(63) Continuation of application No. PCT/GB00/01126, filed on Mar. 24, 2000.

(30) Foreign Application Priority Data

May 5, 1999 (GB) ................................................ 9910194

(51) Int. Cl.$^7$ ................................................ B60T 8/34
(52) U.S. Cl. ................................ 303/113.4; 303/122.09; 303/3; 303/20; 303/115.2
(58) Field of Search ................ 303/20, 3, 122.04, 303/122.09, 199, 113.4, 115.1, 115.2, 116.1, 15

(56) References Cited

U.S. PATENT DOCUMENTS

| 4,804,073 | A |   | 2/1989  | Taig et al.      |           |
|-----------|---|---|---------|------------------|-----------|
| 5,139,315 | A |   | 8/1992  | Walenty et al.   |           |
| 6,074,019 | A | * | 6/2000  | Phillips et al.  | 303/113.5 |
| 6,158,822 | A | * | 12/2000 | Shirai et al.    | 188/1.11 L |
| 6,189,982 | B1 | * | 2/2001  | Harris et al.    | 303/116.1 |
| 6,234,585 | B1 | * | 5/2001  | Harris et al.    | 303/113.4 |
| 6,256,570 | B1 | * | 7/2001  | Weiberle et al.  | 188/170   |
| 6,270,172 | B1 | * | 8/2001  | Shirai et al.    | 303/112   |
| 6,318,817 | B1 | * | 11/2001 | Martin et al.    | 303/116.1 |
| 6,345,871 | B1 | * | 2/2002  | Harris et al.    | 303/113.4 |
| 6,398,319 | B1 | * | 6/2002  | Wilson et al.    | 303/122.03 |
| 6,406,102 | B1 | * | 6/2002  | Arnold           | 303/20    |

FOREIGN PATENT DOCUMENTS

| DE | 196 53 541 A | 6/1998  |
| DE | 197 58 289 A | 7/1999  |
| WO | WO 00/68056  | 11/2000 |

OTHER PUBLICATIONS

European Patent Office English language abstract of DE 19653531A, Retrieved from the Internet: URL: http://12.espacenet.com/dips/viewer?PN=DE19653541&CY=ep&LG=en&DB=EPD, printed Nov. 1, 2001.
European Patent Office English language abstract of DE 19758289A, Retrieved from the Internet: URL: http://12.espacenet.com/dips/viewer?PN=DE19758289&CY=ep&LG=en&DB=EPD, printed Nov. 1, 2001.

* cited by examiner

Primary Examiner—Christopher P. Schwartz
Assistant Examiner—Devon Kramer
(74) Attorney, Agent, or Firm—Macmillan, Sobanski & Todd, LLC

(57) ABSTRACT

A vehicle braking system comprising an electro-hydraulic braking system of the type which operates normally in a brake-by-wire mode wherein hydraulic pressure is applied to braking devices at the vehicle wheels (18a–d) in proportion to the driver's braking demand as sensed electronically at a brake pedal (10), and which, if the brake-by-wire mode should fail, operates in a push-through mode wherein hydraulic pressure is applied to the braking devices at the vehicle wheels (18) by way of a master cylinder (34) coupled mechanically to the braked pedal (10), and an electric parking braking system for enabling the braking devices to be actuated for parking braking purposes. For supplementing the push-through braking provided by the electro-hydraulic braking system in the event that the brake-by-wire mode has failed, it is arranged that the operation of the brake pedal (10) by the driver also causes operation of the electric parking braking system.

15 Claims, 2 Drawing Sheets

BACK-UP BRAKING IN VEHICLE BRAKING SYSTEMS

CROSS REFERENCE TO RELATED APPLICATIONS

This application is a continuation of PCT application number PCT/GB00/01126 filed Mar. 24, 2000, which further claims priority to Great Britain Application GB 9910194.1 filed May 5, 1999, the disclosures of which are incorporated herein by reference.

BACKGROUND

The present invention is concerned with improving braking performance in vehicle braking systems, in particular within the context of vehicle braking systems having electro-hydraulic (EHB) braking.

A typical EHB system for a vehicle comprises a brake pedal, respective braking devices which are connected to the vehicle wheels and which are capable of being brought into communication with electronically controlled proportional control valves in order to apply hydraulic fluid under pressure to the braking devices, a hydraulic pump driven by an electric motor, and a high pressure hydraulic pre accumulator fed by said pump for the provision of hydraulic fluid under pressure which can be passed to the bra device via the proportional control valve in order to apply hydraulic fluid under pressure to the braking devices in so called "brake-by-wire" mode in proportion to the driver's demand as sensed at the brake pedal. The EHB system is controlled by an electronic controller (ECU).

In order to enable the vehicle to be braked in conditions where for some reason, the ERB system has become inoperative, for example because of a major component failure, it is usual in vehicles fitted with EHB to include a mechanical back-up system comprising a master cylinder which is linked to the brake pedal and which can be arranged to be coupled hydraulically to respective brake actuators at the front wheels to provide at least some braking in the event of total EHB failure. This is known as the "push-tough" mode of braking. In order to make the PM system "feel" like a conventional braking system in the "push-through" mode of braking, a travel simulator is also usually provided which is connected hydraulically to the master cylinder coupled to the brake pedal and which allows, by increasing the volume under pressure, the brake pedal to be depressed to an extent comparable with that of conventional systems.

The performance of an electro-hydraulic braking system (EHB) in its back-up (push-through) operating mode is, however, not as good as when the EHB is working normally in that there is no braking at all at the rear axle and no booster function for the action of the hydraulic cylinder.

Some prior art systems provide 4-wheel push-through, but do not isolate the power-circuit fluid from that in the hydrostatic push-through circuit. This makes the push-through function vulnerable to fluid aeration.

One could in principle provide 4-wheel push-through braking, but only by using two more isolation pistons, two more isolation solenoid valves and a larger master cylinder. However, this would be unacceptable due to the cost, packaging and consideration of additional heat dissipation and electrical energy consumption.

Some vehicles are now fitted with electrically operated parking brake systems (EPB) wherein for paring purposes, the normal braking devices, in addition to being actuable hydraulically, can be brought into a braking condition electrically. For example, the brake actuator can include a piston which is drivable by a reversible electric motor to apply and retract the brake shoes from a brake disc for respectively applying and releasing parking braking.

SUMMARY OF THE INVENTION

In accordance with the present invention, there is provided a vehicle braking system comprising an electro-hydraulic braking means of the type which operates normally in a brake-by-wire mode wherein hydraulic pressure is applied to braking devices at the vehicle wheels in proportion to the driver's braking demand as sensed electronically at a brake pedal, and which, if the brake-by-wire mode should fail, operates in a push-through mode wherein hydraulic pressure is applied to the braking devices at the vehicle wheels by way of a master cylinder coupled mechanically to the brake pedal, and an electric parking braking means for enabling the braking devices to be actuated for parking braking purposes, wherein for supplementing the push-through braking provided by the electro-hydraulic braking means in the event that the brake-by-wire mode had failed, it is arranged that the operation of the foot pedal by the driver also causes operation of the electric parking braking.

To achieve this, an ECU within the EPB system should preferably receive a signal indicating the operational status of the EBB system. With such an arrangement, whenever the EHB is working correctly, then the EPB would receive the EHB status signal and respond only to the normal paring-brake control. On the other hand, if the EBB status signal is not received by the ECU of the EPB, indicating that the EBB is not operational then the parking braking will be allowed to respond, not only to the parking brake control but also to the operation of the brake pedal. Braking will then be obtained from both the push-through operation and EPB.

In some embodiments of such a system, there could be the problem that failure of the status signal link between the ECUs in the EHB and the EPB, for example by way of an open-circuit connector fault, could allow the EPB to operate in response to brake pedal signals at times when the EHB was actually still operational. The additional brake torque resulting from both systems operating together could cause severe overbraking at the rear axle, with a consequential risk of vehicle instability.

To overcome this problem, it is preferred that electro-hydraulic braking at the rear axle of the vehicle is allowed only when a control unit of the electro-hydraulic braking means has confirmation that the electric parking means is in a satisfactory operational state.

The system can include electronic control units for controlling electro-hydraulic braking and electric parking braking, respectively, which are interconnected such that electro-hydraulic braking at the rear axle of the vehicle is allowed only when the control unit for electro-hydraulic braking has confirmation from the control unit for electric parking braking that the electric parking means is in said satisfactory operational state.

Advantageously, the control unit for electro-hydraulic braking is arranged to provide a fit status signal to the control unit for electric parking braking whereby whenever a status signal indicative of the electro-hydraulic braking means being in a satisfactory operational state is received by the control unit for electric parking braking, the electric braking means responds only to parking braking control.

Also advantageously, the control unit for electric parking braking is arranged to direct a second status signal to the control unit for electro-hydraulic braking for providing said confirmation that the electric parking braking means is in said satisfactory operational state.

Preferably, said first and second status signals are transferred between the control units via a common link whereby if the link itself fails, neither status signal is transferred between the two control units.

BRIEF DESCRIPTION OF THE DRAWINGS

The invention is described further hereinafter, by way of example only, with reference to the accompanying drawings, in which.

DETAILED DESCRIPTION OF THE PREFERRED EMBODIMENT

Figure 1:
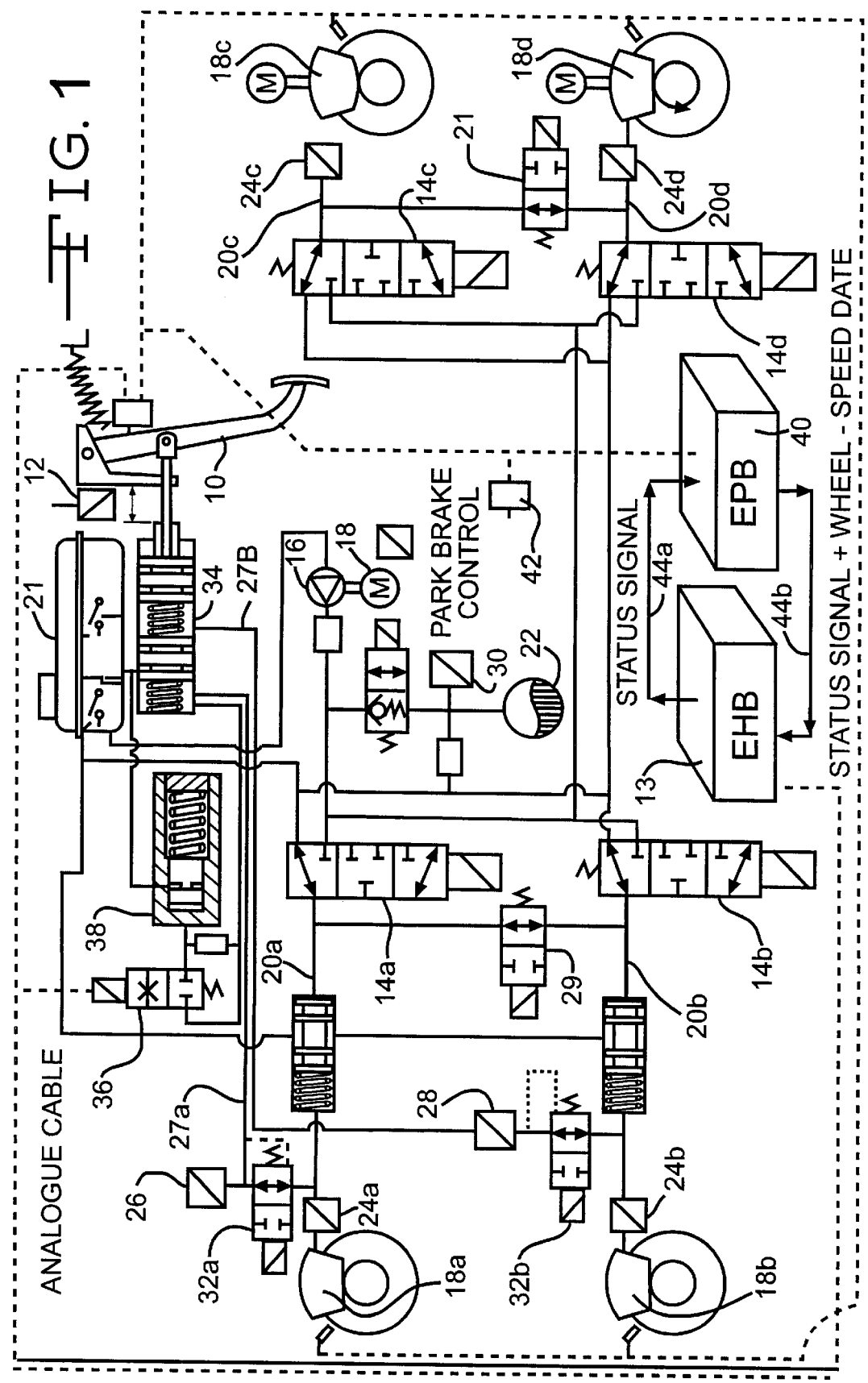
FIG. 1 is a schematic illustration of one embodiment of an electro-hydraulic braking system to which the present invention is applicable.

Referring first to FIG. 1, the illustrated EHB system comprises a brake pedal 10 with an associated sensor 12 for the acquisition of the driver's braking demand. The driver's demand is transferred to an electronic control unit (ECU) 13, evaluated there, and used as the source for the generation of electrical control signals for proportional solenoid control valves 14a, 14b, 14c, 14d, a hydraulic pump 16, wheel brakes 18a, 18b of one axle supplied with hydraulic fluid by electrically actuated brake channels 20a, 20b and wheel brakes 18c, 18d of the other axle supplied by electrically actuated channels 20e, 20d. Hydraulic fluid for the system is stored in a reservoir 21.

Under normal braking conditions, brake pressure modulation in the electrically actuated brake channels 20a, 20b, 20c 20d is effected in a known manner by means of the proportional solenoid control valves 14a, 14b, 14c and 14d, the brake pressure being provided by a pressure accumulator/reservoir 22 whose pressure is maintained by the pump 16 operated by an electric motor 18.

Pressure sensors 24a and 24b monitor the hydraulic pressure at the wheel brakes 18a, 18b of the front axle and pressure sensors 24c and 24d monitor the hydraulic pressure at the wheel bees 18c, 18d of the rear axle. Further pressure sensors 26, 28 monitor the pressure within push-through circuits 27a, 27b for the right and left front wheel brakes and a pressure sensor 30 monitors the supply pressure in the accumulator/reservoir 22. Respective solenoids 29 and 21 enable the brake channels 20a, 20b and 20c, 20d to be coupled together.

The push-through circuits 27a, 27b include respective solenoid controlled valves 32a, 32b to enable these circuits to be closed (open-circuited) during normal brake-by-wire operation.

The push-through arrangement includes a master cylinder 34 coupled to the brake pedal 10 and to the circuits 27a, 27b, the master cylinder enabling the front (brakes to be actuated manually in the event of failure of the brake-by-wire system. Coupled to the master cylinder 34 via a solenoid operated valve 36 is a travel simulator 38 which is activated hydraulically by master-cylinder pressure to give "feel" to the driver during push-through operation of the brakes. The connection between the master cylinder 34 and the travel simulator 38 is controllable by the electrically operated valve 36, so that unnecessary pedal travel can be avoided during manual actuation by closure of this valve.

Also shown diagrammatically in FIG. 1 is an electronic parking brake (EPB) control arrangement comprising an EPB, ECU 40 and a park brake actuator/control 42 by which at least some of the brake actuators 18 can be operated electrically, for example by way of respective electric motors, to apply the foundation brakes for vehicle parking purposes.

The system described thus far is already known.

In the illustrated embodiment of the present invention, there is provided a first link between the EHB and the EPB which is arranged to carry a status signal from the EBB to the EPB which shows the status of the EHB and in particular indicates to the EPB when the EHB is not functioning correctly. Whenever the EBB is functioning correctly, then the EPB is advised accordingly via the link 44a and is arranged to respond only to the parking brake control. However, if the EHB status signal is not received by the EPB ECU via the link 44a, then the parking brake is allowed to respond to brake-pedal operation, as well as to parking brake control.

In addition to the link 44a, the illustrated embodiment includes a second link 44b carrying a second status signal, this time from the EPB to the EHB. In practice, the links 44a, 44b would be carried by the same wire/bus in different time slots in accordance with conventional techniques. The EHB is programmed such that EHB braking of the rear axle is allowed only when the EPB status signal indicates that the park-brake system is correct.

Thus, if the link 44a/44b carrying the status signals is intact and if the status signal is received by the EPB showing that the EBB is working correctly, then the EPB will work only in response to the parking-brake (EPB) control and it is not possible for overbraking to occur by the EHB and EPB being actuated together. Furthermore, the EHB will work normally, with braking taking place at the brake actuators of both the front and rear axles.

However, if the link 44a/44b fails for any reason, for example because of an open circuit fault then as well as the EPB receiving no status signal from the EHB the EHB receives no status signal from the EPB and is therefore cored to work only on the front brakes (braking of the rear wheels being disabled as described above).

Thus, if the reason why the EPB receives no status signal from the EHB is that the link 44a is faulty rather than because the EHB itself is not functional, then although the EHB remains functional it only operates on the front brakes and it is unlikely that severe overbraking would result.

However, because EPB is not designed for the application of precisely-known braking torque, there is still some risk that the EPB may cause instability by locking the rear wheels. This problem can be addressed by arranging the system layout such that wheelspeed data is available to the EPB ECU, even at times when the EHB is not working (see FIG. 1). It is then possible to use the technique of EBA (Electronic Brake Apportioning) so that, if the wheels tend to lock, the brake is released and then re-applied to a lower torque level. Alternatively, the EPB can be controlled in a manner similar to ABS—i.e. to cyclically apply and release the parking brakes in response to wheel-speed data.

Figure 2A:
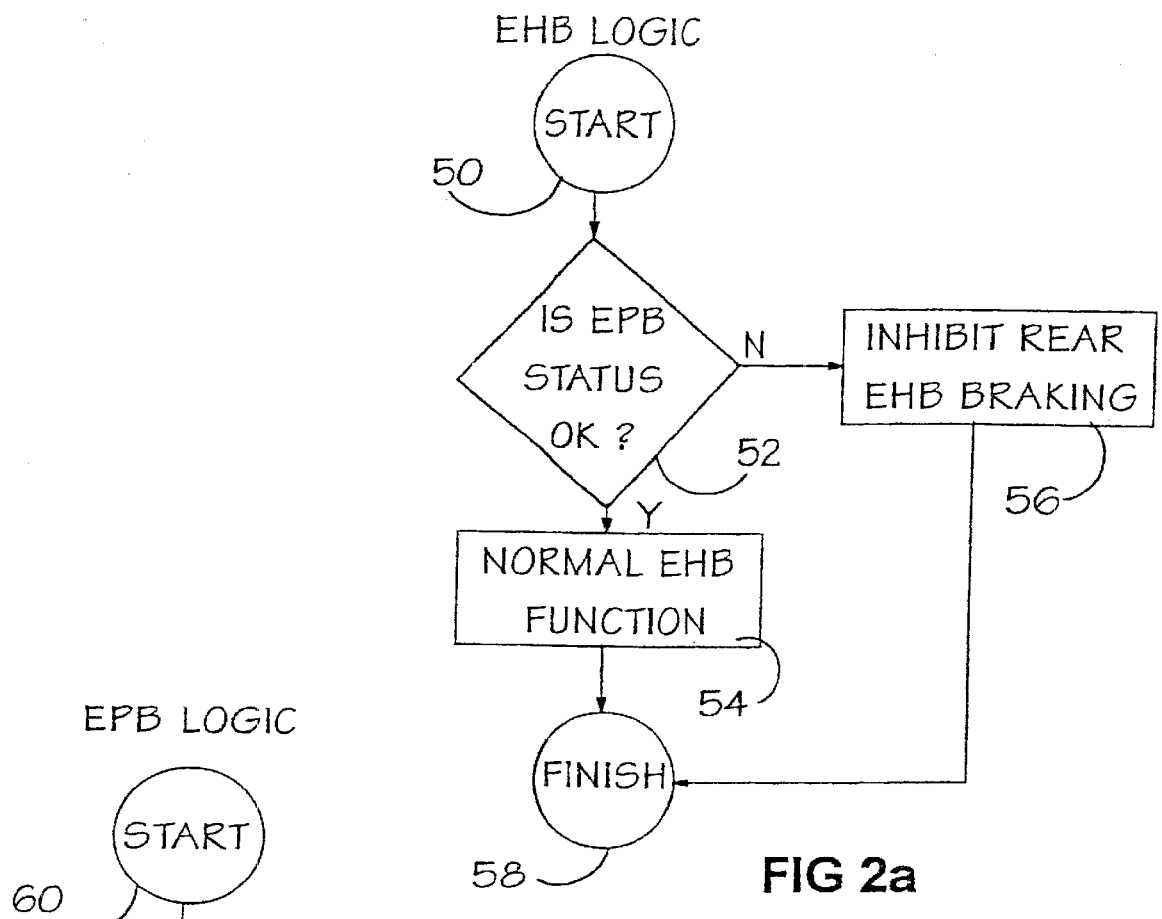
FIGS. 2a and 2b are sequence flow diagrams illustrating one possible routine for the operation of an embodiment in accordance with the present invention.
Figure 2B:
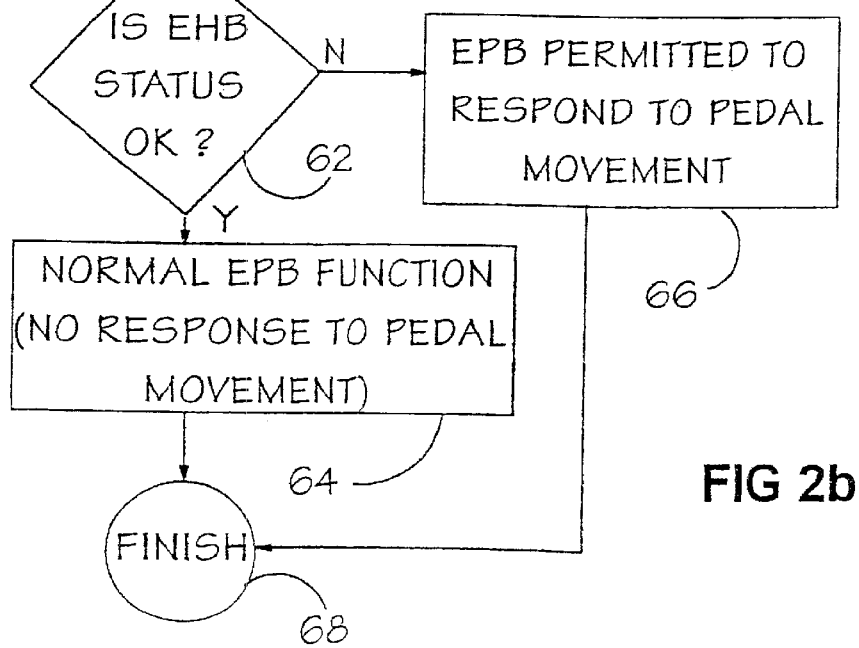

Simplified self explanatory flow diagrams illustrating the aforegoing operation of the EHB and EPB systems are shown in FIGS. 2a and 2b. The flow steps indicated in the diagrams are as follows:

50—Start
52—Is EPB status OK?

54—Normal EHB function
56—Inhibit rear EHB braking
58—Finish
60—Start
62—Is EHB status OK?
64—Normal EPB function (no response to pedal movement)
66—EPB permitted to respond to pedal movement
68—Finish

What is claimed is:

1. A vehicle braking system comprising an electro-hydraulic braking means of the type which operates normally in a brake-by-wire mode wherein hydraulic pressure is applied to braking devices at the vehicle wheels in proportion to the driver's braking demand as sensed electronically at a brake pedal, and which, if the brake-by-wire mode should fail, operates in a push-through mode wherein hydraulic pressure is applied to the braking devices at the vehicle wheels by way of a master cylinder coupled mechanically to the brake pedal, and an electric parking braking means for enabling the braking devices to be actuated for parking braking purposes, wherein for supplementing the push-through braking provided by the electro-hydraulic braking means in the event that the brake-by-wire made has failed, it is arranged that the operation of the brake pedal by the driver also causes operation of the electric parking braking means.

2. A vehicle braking system as claimed in claim 1, wherein it is arranged that electro-hydraulic brake at the rear axle of the vehicle is allowed only when a control unit of the electro-hydraulic braking means has confirmation that the electric parking braking means is in a satisfactory operation state.

3. A vehicle braking system as claimed in claim 2, which includes electronic control units for controlling electro-hydraulic braking and electric parking braking respectively, which are interconnected such that electro-hydraulic braking at the rear axle of the vehicle is allowed only when the control unit for electro-hydraulic braking has confirmation from the control unit for electric parking braking that the electric parking braking means is in said satisfactory operational state.

4. A vehicle braking system as claimed in claim 3, wherein the control unit for electro-hydraulic braking is arranged to provide a first status signal to the control unit for electric parking braking whereby whenever a status signal indicative of the electro-hydraulic braking means being in a satisfactory operational state is received by the control unit for electric parking braking, the electric parking braking means responds only to parking braking control.

5. A vehicle big system as claimed in claim 4, wherein the control unit for electric parking braking is arranged to direct a second status signal to the control unit for electro-hydraulic braking for providing said confirmation that the electric parking braking means is in said satisfactory operational state.

6. A vehicle braking system as claimed in claim 5 wherein said first and second status signals are transferred between the control units via a common link whereby if the link itself fails, neither status signal is transferred between the two control units.

7. A vehicle braking system comprising:
an electro-hydraulic braking arrangement which operates normally in a brake-by-wire mode, wherein hydraulic pressure is applied to braking devices at the vehicle wheels in proportion to the driver's braking demand as sensed electronically at a brake pedal, and which, if the brake-by-wire made should fail, operates in a push-through mode wherein hydraulic pressure is applied to at least one of the braking devices by way of a master cylinder coupled mechanically to the brake pedal; and an electric parking brake arrangement adapted to selectively actuate at least another one of the braking devices for parking braking purposes, the electric parking brake arrangement further being adapted to selectively actuate the at least another one of the braking devices at the same time that the electro-hydraulic braking arrangement is operating in the push-through mode to apply hydraulic pressure to the at least one of the braking devices.

8. The vehicle braking system according to claim 7 wherein the at least one of the braking devices is associated with a front wheel of a vehicle, and the at least another one of the braking devices is associated with a rear wheel of the vehicle.

9. The vehicle braking system according to claim 7 wherein the electro-hydraulic braking arrangement further includes a first controller adapted to control the operation of components of the electro-hydraulic braking arrangement to control the application of hydraulic pressure to the braking devices when operating in the brake-by-wire mode, and wherein the electric parking brake arrangement further includes a second controller adapted to control the selective actuation of the another one of the braking devices, the first and second controllers electrically communicating with each other to coordinate operation of the electro-hydraulic braking arrangement and the electric parking brake arrangement.

10. The vehicle braking system according to claim 9 wherein the first controller and the second controller electrically communicate to regulate the braking force applied in the event that the brake-by-wire mode has failed.

11. The vehicle braking system according to claim 10 wherein the second controller prevents actuation of the another one of the braking devices by the electric parking brake arrangement if the second controller loses communication with the first controller.

12. The vehicle braking system according to claim 10 wherein the second controller receives a position signal indicative of the position of the brake pedal, the signal being used by the second controller to control operation of the electric parking brake arrangement in response to changes in the position signal when operating in a pedal-responsive mode, the second controller being further capable of operating the electric parking brake arrangement in a parking brake control mode for normal operation of the another one of the braking devices when the vehicle is parked.

13. The vehicle braking system according to claim 12 wherein the second controller operates the electric parking brake arrangement only in the parking brake control mode if a signal indicative of the electro-hydraulic braking arrangement being in a satisfactory operational state is received by the second controller.

14. The vehicle braking system according to claim 7 wherein the at least one of the braking devices is associated with a front wheel of a vehicle, and the at least another one of the braking devices is associated with a rear wheel of the vehicle, and wherein during a failure of the brake-by-wire mode of operation, operation of the electro-hydraulic braking arrangement in the push-through mode controls braking of the front wheel and is coordinated with operation of the electric parking brake arrangement, which controls braking of the rear wheel.

15. A vehicle braking system comprising:

an electro-hydraulic braking arrangement which operates normally in a brake-by-wire mode, wherein hydraulic pressure is applied to braking devices at the vehicle wheels in response to an electronic braking demand signal, and which, if the brake-by-wire mode should fail, operates in a push-through mode wherein hydraulic pressure is applied to at least one of the braking devices by way of a master cylinder coupled mechanically to a brake pedal; and an electric parking brake arrangement adapted to selectively actuate at least another one of the braking devices for parking braking purposes, the electric parking brake arrangement further being adapted to selectively actuate the at least another one of the braking devices in response to movement of the brake pedal in coordination with the actuation of the electro-hydraulic braking arrangement in the push-through mode.

* * * * *